United States Patent
Kwon et al.

(10) Patent No.: US 8,455,154 B2
(45) Date of Patent: Jun. 4, 2013

(54) THERMAL SHOCK-TOLERANT SOLID OXIDE FUEL CELL STACK

(75) Inventors: Oh-Hun Kwon, Westborough, MA (US); Yeshwanth Narendar, Westford, MA (US); Rakesh Kapoor, Shrewsbury, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 159 days.

(21) Appl. No.: 12/648,949

(22) Filed: Dec. 29, 2009

(65) Prior Publication Data

US 2010/0178589 A1    Jul. 15, 2010

Related U.S. Application Data

(60) Provisional application No. 61/204,035, filed on Dec. 31, 2008.

(51) Int. Cl.
*H01M 2/08* (2006.01)
(52) U.S. Cl.
USPC ............ 429/507; 429/452; 429/471; 429/510
(58) Field of Classification Search
USPC .................................. 429/452, 471, 507, 510
See application file for complete search history.

(56) References Cited

U.S. PATENT DOCUMENTS

| | | | |
|---|---|---|---|
| 2002/0177031 A1 | 11/2002 | Doshi et al. | |
| 2003/0003343 A1* | 1/2003 | Cisar et al. | 429/36 |
| 2005/0019636 A1 | 1/2005 | Kwon et al. | |
| 2005/0112442 A1* | 5/2005 | Wells et al. | 429/34 |
| 2006/0035132 A1* | 2/2006 | Ariyoshi et al. | 429/34 |
| 2007/0054170 A1* | 3/2007 | Isenberg | 429/33 |
| 2007/0111069 A1 | 5/2007 | Rehg et al. | |
| 2007/0237999 A1* | 10/2007 | Donahue et al. | 429/32 |
| 2007/0259252 A1* | 11/2007 | Koc | 429/40 |
| 2009/0186250 A1 | 7/2009 | Narendar et al. | |

FOREIGN PATENT DOCUMENTS

| | | |
|---|---|---|
| EP | 1304755 A2 | 4/2003 |
| JP | H5-186277 A | 7/1993 |
| JP | H6-502957 A | 3/1994 |
| JP | 2007-141842 A | 6/2007 |
| WO | 92/04740 | 3/1992 |
| WO | 03/092046 A2 | 11/2003 |

OTHER PUBLICATIONS

A. Mitterdorfer and L. J. Gauckler, Mat. Res. Soc. Symp. Proc. vol. 453, 1997 Materials Research Society, pp. 525-530.*
Notification of Transmittal of the International Search Report and The Written Opinion of the International Searching Authority, or the Declaration, International Appliction No. PCT/US2009/069728, date mailed Jul. 15, 2010 (9 pages).

(Continued)

*Primary Examiner* — Yogendra Gupta
*Assistant Examiner* — Jeremiah Smith
(74) *Attorney, Agent, or Firm* — Robert N. Young; Abel Law Group, LLP

(57) ABSTRACT

A solid oxide fuel cell (SOFC) includes a plurality of subassemblies. Each subassembly includes at least one subcell of a first electrode, a second electrode and an electrolyte between the first and second electrodes. A first bonding layer is at the second electrode and an interconnect layer is at the first bonding layer distal to the electrolyte. A second bonding layer that is compositionally distinct from the first bonding layer is at the interconnect layer, whereby the interconnect partitions the first and second bonding layers. A method of fabricating a fuel cell assembly includes co-firing at least two subassemblies using a third bonding layer that is microstructurally or compositionally distinct from the second bonding layer.

19 Claims, 3 Drawing Sheets

OTHER PUBLICATIONS

Notification of Transmittal of International Preliminary Report on Patentability, International Application No. PCT/US2009/069728, date mailed Jul. 14, 2011.

Extended Search Report for Application No. 09837129.7, Oct. 2, 2012, 6 pages.

"High Temperature Solid Oxide Fuel Cells: Fundamentals, Design and Applications," pp. 119-143, Singhal, et al. Ed., Elsevier Ltd. (2003).

"High Temperature Solid Oxide Fuel Cells: Fundamentals, Design and Applications," pp. 149-169, Singhal, et al. Ed., Elsevier Ltd. (2003).

"High Temperature Solid Oxide Fuel Cells: Fundamentals, Design and Applications," pp. 83-112, Singhal, et al. Ed.. Elsevier Ltd. (2003).

"High Temperature Solid Oxide Fuel Cells: Fundamentals, Design and Applications," pp. 83-225, Singhal, et al. Ed., Elsevier Ltd. (2003).

* cited by examiner

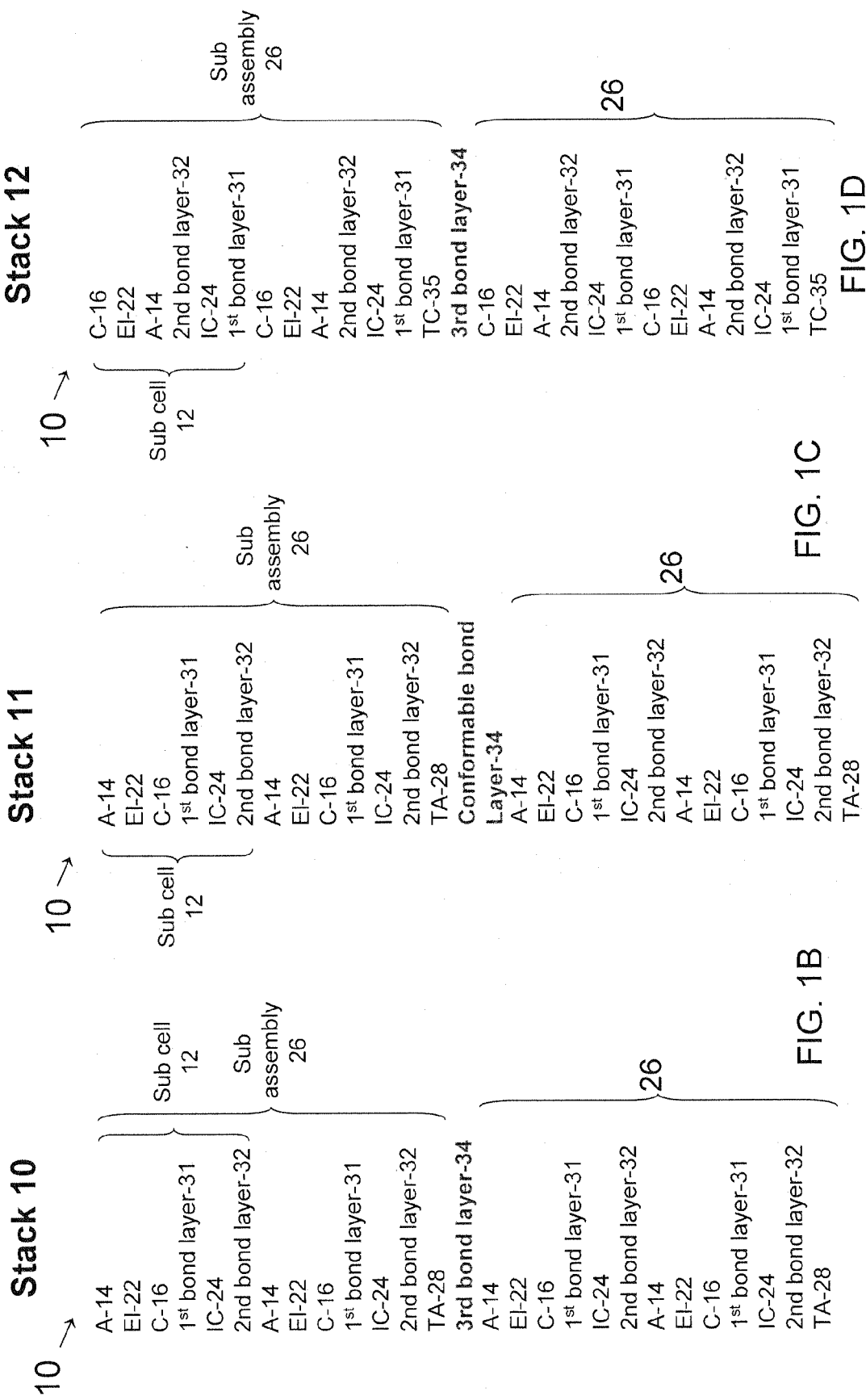

THERMAL SHOCK-TOLERANT SOLID OXIDE FUEL CELL STACK

RELATED APPLICATION

This application claims the benefit of U.S. Provisional Application No. 61/204,035, filed on Dec. 31, 2008.

The entire teachings of the above application are incorporated herein by reference.

BACKGROUND OF THE INVENTION

A fuel cell is a device that generates electricity by a chemical reaction. Among various fuel cells, solid oxide fuel cells use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode.

Recently, fuel cells have been designed as stacks, whereby subassemblies, each including a cathode, an anode and a solid electrolyte between the cathode and the anode, are assembled in series by locating an electrical interconnect between the cathode of one subassembly and the anode of another.

However, stacks of individual fuel cells can be susceptible to damage caused by fluctuation in temperature during their formation or use. Specifically, materials employed to form the various components, including ceramics of differing compositions, exhibit distinct coefficients of thermal expansion, thermal conductivity and strength. As a consequence, fuel cells have limited tolerance for changes in temperature. Problems associated with mechanical stress caused by changes in temperature are exacerbated when individual fuel cells are stacked. Limited thermal shock resistance of fuel cells, particularly of fuel cells assembled in stacks, limits the yield of production and poses a heightened risk of failure during operation.

Therefore, a need exists to minimize or eliminate the above-referenced problems.

SUMMARY OF THE INVENTION

The invention generally is directed to fuel cell assemblies that include a first, a second, and a third bonding layer of distinct compositions between subassemblies.

In one embodiment, the invention can be a subcell of a fuel cell assembly. The subcell can include a first electrode and a second electrode. An electrolyte partitions the electrodes. A first bonding layer can be at the second electrode and distal to the electrolyte. An interconnect can be at the first bonding layer. A second bonding layer that can be compositionally distinct from the first bonding layer can be at the interconnect layer, whereby the interconnect layer can partition the first bonding layer and the second bonding layer. The subcell is operable by oxidation of a fuel directed to one of the first or second electrodes to thereby form at least water. In some embodiments, the second electrode can be a cathode. The cathode can include at least one member selected from the group consisting of a lanthanum-manganite based material and a lanthanum-ferrite based material. The first bonding layer at the cathode can include a component common to the cathode. The interconnect layer can include a component common to the cathode and the bonding layer at the cathode. The interconnect layer can include at least one member selected from the group consisting of lanthanum titanate, lanthanum chromate, strontium titanate, and lanthanum strontium titanate (LST). The first electrode can be an anode that includes nickel and at least one member containing an oxide or mixture of oxides selected from the group consisting of yttrium, strontium, and zirconium. The anode can include a doped material including at least one member selected from the group consisting of yttria-stabilized zirconia (YSZ), cerium oxide, and LST. The anode can include YSZ having zirconia with about 15% yttria ($Y_2O_3$) by weight. The electrolyte can include at least one member selected from the group consisting of yttria-stabilized zirconia, lanthanum strontium manganite, cerium oxide, scandia, and zirconia. The first bonding layer can include at least one member selected from the group consisting of lanthanum strontium manganite, lanthanum cerium manganite, and lanthanum strontium nickel. The second bonding layer can include at least one member selected from the group consisting of nickel-yttria-stabilized-zirconia, nickel-lanthanum-strontium-titanate, nickel felt, and nickel mesh. In certain embodiments, the first electrode can include nickel and at least one member containing an oxide or mixture of oxides selected from the group consisting of yttrium, strontium, and zirconium. The electrolyte can include at least one member selected from the group consisting of yttria-stabilized zirconia, lanthanum strontium manganite, cerium oxide, scandia, and zirconia. The second electrode can include at least one member selected from the group consisting of a lanthanum-manganite based material and a lanthanum-ferrite based material. The first bonding layer can include at least one member selected from the group consisting of lanthanum strontium manganite, lanthanum cerium manganite, and lanthanum strontium nickel. The interconnect can include at least one member selected from the group consisting of lanthanum titanate, lanthanum chromate, strontium titanate, and lanthanum strontium titanate (LST). The second bonding layer can include at least one member selected from the group consisting of nickel-yttria-stabilized-zirconia, nickel-lanthanum-strontium-titanate, nickel felt, and nickel mesh. In some embodiments, the second electrode can be an anode.

In yet another embodiment, a fuel cell assembly can comprise at least two subassemblies, each subassembly including at least one subcell, wherein each subcell can include a first electrode, a second electrode, an electrolyte between the electrodes, and first and second bonding layers. The first bonding layer can be at the second electrode, an interconnect layer partitioning the first and second bonding layers. A third bonding layer can be placed between the at least two subassemblies that can be microstructurally or compositionally distinct from the second bonding layer.

The invention is also directed to a method of forming a fuel cell that includes the step of providing at least two subassemblies consisting of at least one subcell, each subcell including a first electrode, a second electrode, an electrolyte between the electrodes, and first and second bonding layers. The first bonding layer can be at the second electrode, and an interconnect layer can partition the first and second bonding layers. The method further includes the step of co-firing at least two subassemblies and adding a third bonding layer between one subassembly and an active anode of the second subassembly. The third bonding layer can be microstructurally or compositionally distinct from the second bonding layer.

An advantage of this invention is that solid oxide fuel cell stacks of the invention have improved thermal shock resistance. The bond layers of this invention provide compliance in an otherwise rigid stack. In addition, the concept of making subassemblies that are bonded enables inspection and removal of defective subassemblies prior to stack assembly and operation, thus increasing overall reliability and manufacturing yield.

The present invention can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

BRIEF DESCRIPTION OF THE DRAWINGS

FIGS. 1A-D are schematic cross sectional views of embodiments of a fuel cell assembly of the invention.

DETAILED DESCRIPTION OF THE INVENTION

Figure 1A:
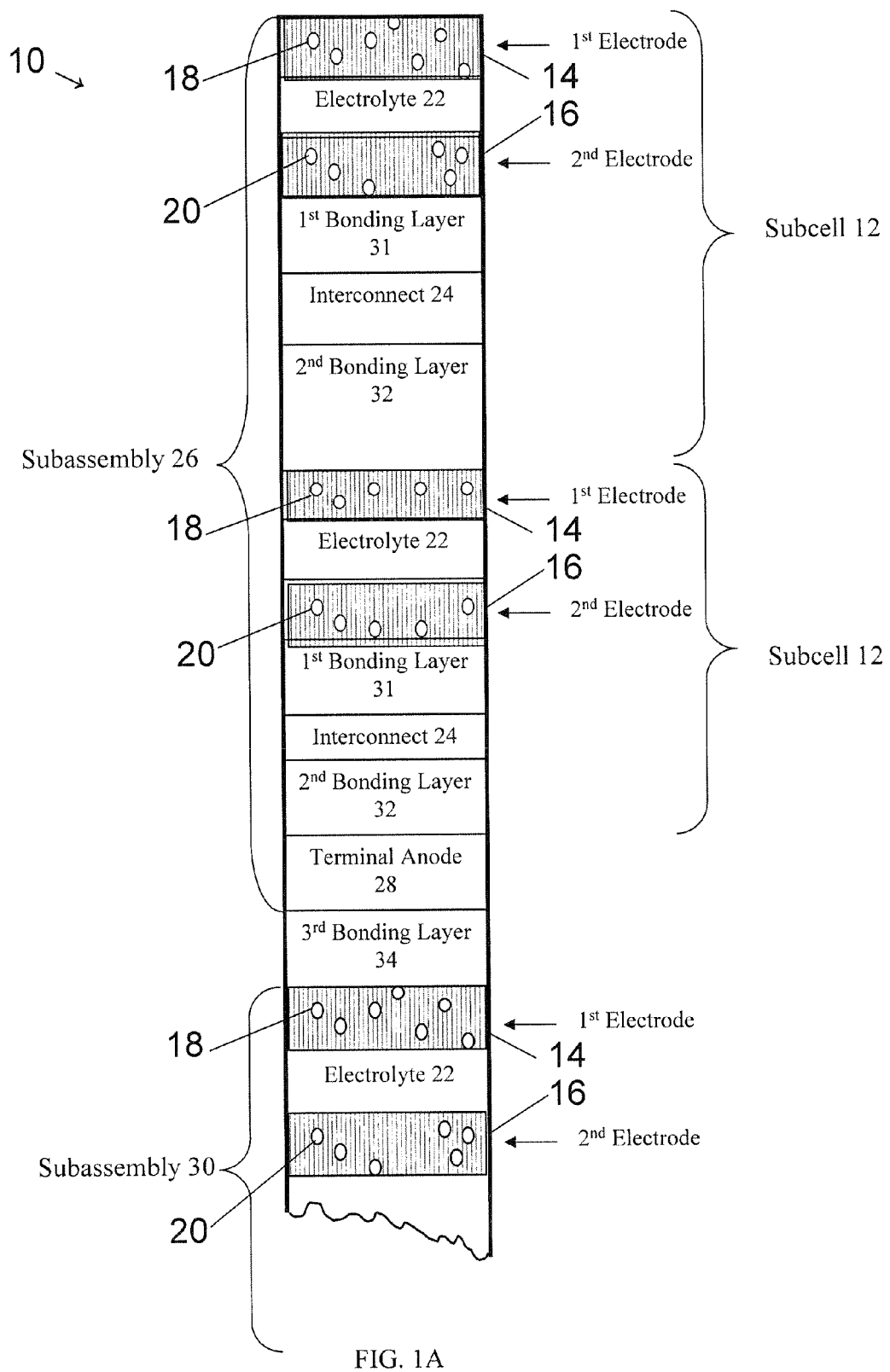

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. The teachings of all patents, published applications and references cited herein are incorporated by reference in their entirety.

FIGS. 1A-D show fuel cell 10 of the invention. Fuel cell 10 includes a plurality of subcells 12 and each subcell 12 includes first electrode 14 and second electrode 16. Typically, first and second electrodes 14 and 16 are porous. In fuel cell 10, first electrode 14 at least in part defines the plurality of first gas channels 18 in fluid communication with a fuel gas source, such as hydrogen ($H_2$) gas or natural gas which can be converted to $H_2$ gas in situ at first electrode 14. Second electrode 16 at least in part defines a plurality of second gas channels 20 in fluid communication with a source of oxygen gas, such as air. First gas channels 18 and second gas channels 20 can be included in the schematic representations shown in FIGS. 1B-D.

Although, in FIG. 1A, first electrodes 14 and second electrodes 16 define a plurality of gas channels 18 and 20, other types of gas channels, such as a microstructured channel (e.g., grooved channel) at each of the electrodes or as a separate layer in fluid communication with the electrode, can also be used in the invention. For example, referring to FIG. 2, first gas channel 18 is defined at least in part by first electrode 14 and at least in part by interconnect 24, and second gas channel 20 is defined at least in part by second electrode 16 and by at least in part by interconnect 24. First gas channels 18 and second gas channels 20 can be formed by any suitable technique known in the art, such as, for example, incorporating shaped fugitives, embossing, cutting channels in tapes and laminating the tapes to define channels, using extrusion through preforms, or using patterned rolls in roll compaction.

There exists a variety of possible materials for fugitives, such as, for example, graphite or fibers, that can be used to form the channels or passageways within the cathode and anode layers. Generally, the only limitations on the selection of materials would be that the material would burn or be out-gassed from the fuel cell during the firing process, and that the material is not reactive with the ceramic particles. These two conditions are adequately satisfied by organic based materials. Thus, the fibers can be natural fibers, cotton, bast fibers, cordage fibers, or animal fibers, such as wool, or they may be manufactured fibers, regenerated cellulose, cellulose diacetate, cellulose triacetate, polyamide, polyester, polyacrylic, polyvinyl, polyolefin resins, carbon or graphite fibers, or liquid crystal polymers. Alternatively, the fibers can be extruded lengths of binder material such as synthetic rubber, thermoplastics, or polyvinyl and extruded lengths of plasticizer material such as glycol and phthalate groups. In another embodiment, the material can be pasta, such as spaghetti.

Any suitable cathode materials known in the art can be used for second electrode 16, for example, in "High Temperature Solid Oxide Fuel Cells: Fundamentals, Design and Applications," pp. 119-143, Singhal, et al. Ed., Elsevier Ltd. (2003), the entire teachings of which are incorporated herein by reference. In one embodiment, second electrode 16 includes a La-manganite (e.g., $La_{1-a}MnO_3$, where "a" is equal to or greater than zero, and equal to or less than 0.1) or La-ferrite based material. Typically, the La-manganite or La-ferrite based material is doped with one or more suitable dopants, such as Sr, Ca, Ba, Mg, Ni, Co or Fe. Examples of doped La-manganite based materials include LaSr-manganites (LSM) (e.g., $La_{1-k}Sr_kMnO_3$, where k is equal to or greater than 0.1, and equal to or less than 0.3, (La+Sr)/Mn is in a range of between about 1.0 and about 0.95 (molar ratio)) and LaCa-manganites (e.g., $La_{1-k}Ca_kMnO_3$, k is equal to or greater than 0.1, and equal to or less than 0.3, (La+Ca)/Mn is in a range of between about 1.0 and about 0.95 (molar ratio)). Examples of doped La-ferrite based materials include LaSrCo-ferrite (LSCF) (e.g., $La_{1-q}Sr_qCo_{1-j}Fe_jO_3$, where each of q and j independently is equal to or greater than 0.1, and equal to or less than 0.4, (La+Sr)/(Fe+Co) is in a range of between about 1.0 and about 0.95 (molar ratio)). In one specific embodiment, second electrode 16 includes at least one of a LaSr-manganite (LSM) (e.g., $La_{1-k}Sr_kMnO_3$) and a LaSrCo-ferrite (LSCF). Common examples include $(La_{0.8}Sr_{0.2})_{0.98}MnO_{3\pm\delta}$ ($\delta$ is equal to or greater than zero, and equal to or less than 0.3) and $La_{0.6}Sr_{0.4}Co_{0.2}Fe_{0.8}O_3$.

Any suitable anode materials known in the art can be used for first electrode 14, for example, in "High Temperature Solid Oxide Fuel Cells: Fundamentals, Design and Applications," pp. 149-169, Singhal, et al. Ed., Elsevier Ltd. (2003), the entire teachings of which are incorporated herein by reference. In one embodiment, first electrode 14 includes a nickel (Ni) cermet. As used herein, the phrase "Ni cermet" means a ceramic metal composite that includes Ni, such as about 20 wt %-70 wt % of Ni. Examples of Ni cermets are materials that include Ni, lanthanum strontium titanate (LST), and yttria-stabilized zirconia (YSZ), such as $ZrO_2$ containing about 15 wt % of $Y_2O_3$, and materials that include Ni and Y-zirconia or Sc-zirconia. An additional example of an anode material is Cu-cerium oxide or Co—YSZ. Specific examples of Ni cermet include compositions between 67 wt % Ni and 33 wt % YSZ and 33 wt % Ni and 67 wt % YSZ.

Typically, the thickness of each of first and second electrodes 14 and 16 is independently is in a range of between about 0.3 mm and about 2 mm. Specifically, the thickness of each of first and second electrodes 14 and 16 is, independently, in a range of between about 0.5 mm and about 1.5 mm.

Solid electrolyte 22 is between first electrode 14 and second electrode 16. Any suitable solid electrolytes known in the art can be used in the invention such as those described in "High Temperature Solid Oxide Fuel Cells: Fundamentals, Design and Applications," pp. 83-112, Singhal, et al. Ed., Elsevier Ltd. (2003), the entire teachings of which are incorporated herein by reference. Examples include YSZ, lanthanum strontium manganite (LSM), $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}GaO_3$ where A=Sr, Ca or Ba); and mixtures thereof. Other examples include doped yttrium-zirconate (e.g., $Y_2Zr_2O_7$), doped gadolinium-titanate (e.g., $Gd_2Ti_2O_7$) and brownmillerites (e.g., $Ba_2In_2O_6$ or $Ba_2In_2O_5$). In a specific embodiment, electrolyte 22 includes $ZrO_2$ doped with 8 mol % $Y_2O_3$ (i.e., 8 mol % $Y_2O_3$-doped $ZrO_2$.)

Typically, the thickness of solid electrolyte 22 is in a range of between about 5 μm and about 20 μm, preferably between about 5 μm and about 10 μm. Alternatively, the thickness of solid electrolyte 22 is thicker than about 100 μm (e.g., between about 100 μm and about 500 μm). In this embodiment employing solid electrolyte 22 having a thickness greater than about 100 μm, solid electrolyte 22 can provide structural support for fuel cell 10.

Fuel cell 10 further includes interconnect 24 between cells 12. Any material known to be suitable for use as an interconnect layer can be employed. In an example of a suitable interconnect layer is one formed of chromium, and may further include rare earth elements, such as doped rare earth chromites. In one embodiment, interconnect layer 24 includes at least one of lanthanum, strontium, calcium, cobalt, gallium, yttria, titanate and magnesium. In other particular embodiments, the interconnect layer can include ceramics, such as $LaSrCrO_3$, $LaMgCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$ and $CaCrO_3$. In another embodiment, interconnect 24 can include two layers, as described in U.S. patent application Ser. No. 12/005,656, filed Dec. 27, 2007, entitled, "Bilayer Interconnects For Solid Oxide Fuel Cells," the entire teachings of which are incorporated herein by reference. Subcells 12, connected in series together, make up subassembly 26. Non-functional, or terminal anode 28, can be located at interconnect 24 at one end of subassembly 26. Optional terminal anode 28 is not an operating anode, but can be formed of any material suitable for functioning anodes of subcells.

A plurality of subassemblies and respective interconnects are connected in series. As shown in FIG. 1A, subassemblies are connected at anode 14 at one end of subassembly 30 and terminal anode 28 at one end of subassembly 26 by first bonding layer 31 and second bonding layer 32 layered on top of, and under interconnect 24, respectively. Subassembly 30, which can be different from subassembly 26, is connected to subassembly 26 by third bonding layer 34. The compositions of first bonding layer 31 and second bonding layer 32 are distinct from each other in any given embodiment. The first bonding layer is stable in air and highly conductive while being chemically compatible with interconnect and cathode materials during fabrication and operation. Examples of suitable first bonding layers include cathode materials or combinations of cathode and interconnect or combinations of cathode and electrolyte materials. Typical examples include lanthanum strontium manganite (LSM), lanthanum strontium cobalt ferrite (LSCF) or lanthanum nickel ferrite, alone or in combination with YSZ or lanthanum strontium titanate (LST). The second bonding layer has to be conductive but also stable in reducing atmosphere while being chemically compatible with the anode and interconnect layers. Examples of the second bonding layer are cermets with metals such as Ni, Cu, or Co, that are stable against re-oxidation across wide fuel compositions, and a ceramic phase that helps reduce thermal expansion and also helps bond to the interconnect and anode layers. Examples of suitable second bonding layers include nickel-YSZ, nickel-LST and combinations thereof.

Fuel cell 10 of the invention can include any suitable number of a plurality of subcells 12 in each subassembly. In one embodiment, a stacklet of subcells will include between about six and about ten subcells, and each subassembly of fuel cell 10 will include between about four and about six stacklets, each separated by a conformable bonding layer. Stacks of fuel cell 10 can be connected in series or in parallel.

In one embodiment, subassembly 26 includes between six and about ten subcells 12 and the subassemblies are connected in series using a third bonding layer 34 into a fuel cell stack 10, as shown in FIG. 1B. The composition of third bonding layer 34 is preferably distinct from that of second bonding layer 32. Alternatively, third bonding layer 34 can be microstructurally distinct from second bonding layer 32, such as, for example, a cermet material such as a Ni—YSZ composite with a fine particle size that can form a bond between two subassemblies at a temperature that is in a range between about 50° C. and about 150° C. lower than the co-firing temperature used to fabricate subassemblies.

In another embodiment, subassembly 26 includes between about six and about ten subcells 12 and the subassemblies are connected in series using a conformable third bonding layer 34 into a fuel cell stack 10, as shown in FIG. 1C. "Conformable bonding layer" as that term is employed herein means a bonding layer that is adaptable or conformable to a change in dimension of adjacent layers during fabrication and use of a SOFC assembly of which it is a part, while still bonding one electrode, functional or non-functional, or interconnect, of one subassembly and an active electrode at one end of a subcell of an adjoining subassembly. Examples of suitable conformable bonding layers include metal meshes, metal felts or combinations thereof, preferably coated with metal paste for good electrical conductivity. In addition, small amounts of ceramic phase (less than about 25 vol %) can be added to provide additional dimensional stability. Typical composition of the metallic phase includes Ni-felt, Ni wire, Ni-mesh, Ni flakes with ceramic phase such as YSZ fibers or alumina fibers. Stacks assembled with a conformable bonding layer would likely need to be placed in slight compression to ensure good electrical contact between the subcells or subassemblies and the conformable bonding layer.

Figure 2:
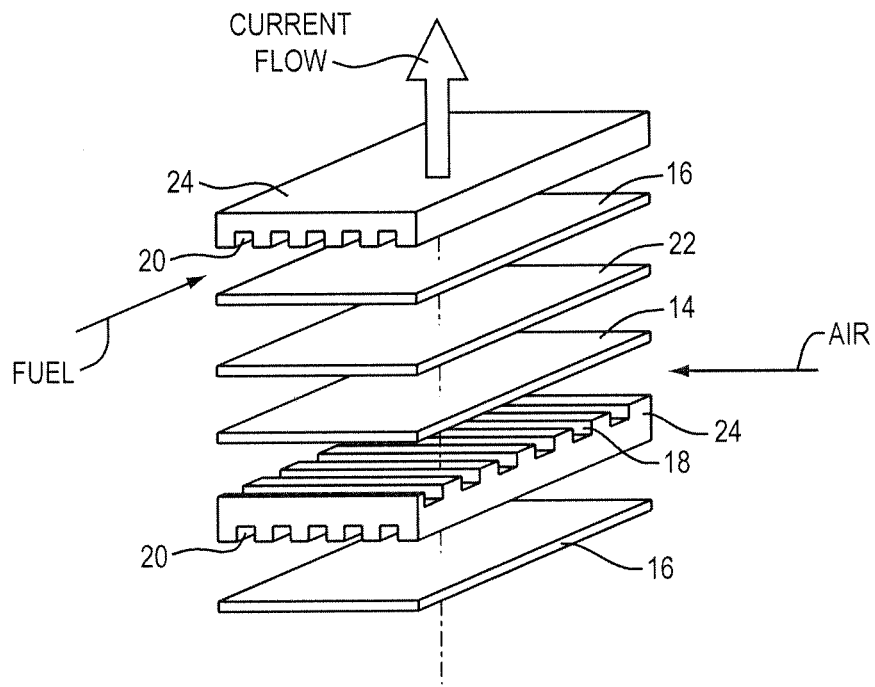
FIG. 2 is a schematic diagram of a component of one embodiment of a fuel cell of the invention having a planar, stacked design.
Figure 3:
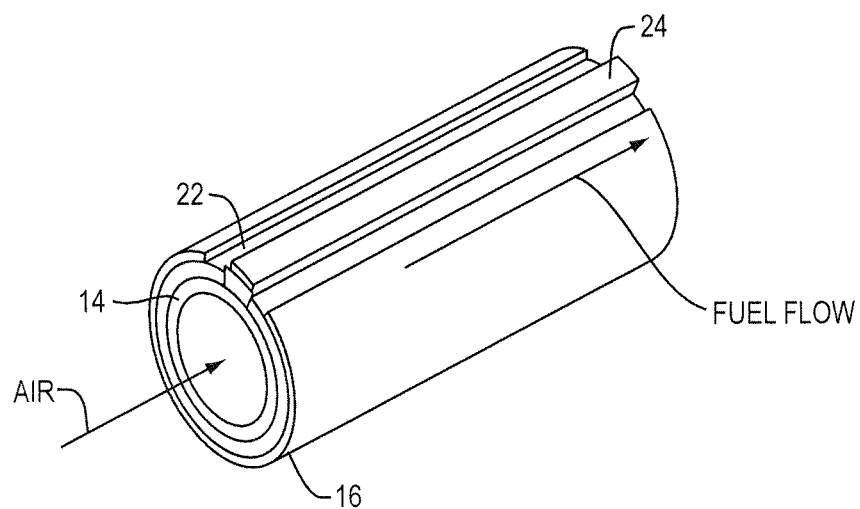
FIG. 3 is a schematic diagram of an embodiment of a fuel cell of the invention having a tubular design.

A fuel cell of the invention can be a planar stacked fuel cell, as shown in FIG. 2. Alternatively, as shown in FIG. 3, a fuel cell of the invention can be a tubular fuel cell. Fuel cell shown in FIGS. 2 and 3 independently have the characteristics, including specific variables, as described for fuel cell 10 as shown in FIG. 1 (for clarity, details of fuel cell components are not depicted in FIGS. 2 and 3). Typically, in the planar design, as shown in FIG. 2, the components are assembled in flat stacks, with air and fuel flowing through channels built into the interconnect. Typically, in the tubular design, as shown in FIG. 3, the components are assembled in the form of a hollowed tube, with the cell constructed in layers around a tubular cathode; air flows through the inner portion and fuel flows around the exterior portion of each subcell, respectively.

The invention also includes a method of forming fuel cells as described above. The method includes forming a plurality of sub-cells 12 as described above, and connecting each subcell 12 with interconnect 24. Fabrication of sub-cells 12 and interconnect 24 can employ any suitable techniques known in the art as described, for example, in "High Temperature Solid Oxide Fuel Cells: Fundamentals, Design and Applications," pp. 83-225, Singhal, et al. Ed., Elsevier Ltd. (2003), the entire teachings of which are incorporated herein by reference. For example, planar stacked fuel cells of the invention can be fabricated by particulate processes or deposition processes. Tubular fuel cells of the invention can be fabricated by having the cell components in the form of thin layers on a porous cylindrical tube, such as calcia-stabilized zirconia.

Typically, a suitable particulate process, such as tape casting or tape calendering, involves compaction of powders, such as ceramic powders, into fuel cell components (e.g., electrodes, electrolytes and interconnects) and densification at elevated temperatures. For example, suitable powder materials for electrolytes, electrodes or interconnects of the invention, are made by solid state reaction of constituent oxides. Suitable high surface area powders can be precipitated from nitrate and other solutions as a gel product, which are dried, calcined and comminuted to give crystalline particles. The deposition processes can involve formation of cell components on a support by a suitable chemical or physical process. Examples of deposition processes include chemical vapor deposition, plasma spraying and spray pyrolysis.

The subcells can be combined to form subassemblies and the subassemblies can be combined to form a fuel cell stack by a suitable technique such as applying a bonding layer such as NiO—YSZ between the active anode of one subassembly and the terminal anode of the second subassembly and co-firing to a temperature that is in a range between about 50° C. and about 150° C. lower than the co-firing temperature of the subassemblies. Typical bond firing temperatures are in a range between about 1150° C. and about 1250° C. for a time period of between about 1 hour and about 3 hours in an air atmosphere. Without wishing to be limited to any particular theory, it is believed that by combining subcells into subassemblies and thereafter combining subassemblies to form stacks, the yield of production is increased and the likelihood of failure is decreased during use of fuel cells as a consequence of reduction in thermal stress consequent to deficiencies in coefficients of expansion of the component parts of the fuel cells.

In another embodiment of the method of the invention, at least two subassemblies are formed independently, where each subassembly includes a first electrode, a second electrode, a solid electrolyte located between the first and second electrode and an interconnect at one of the electrodes. Each subassembly further includes a terminal electrode, such as a terminal anode, over the interconnect at one end of the subassembly. A conformable bonding layer is then disposed over the subassembly at the terminal electrode. The subassembly to which the conformable bonding layer has been applied is then joined with the active anode of a subcell of another subassembly. The two or more subassemblies bonded together by conformable bonding layers, as described, are then compressed to form the fuel cell stack. In this embodiment, shown in FIG. 1C, the joined subassemblies are heated to a temperature in a range of between about 700° C. and about 1000° C., for a period of time in a range of between about 2 hours and about 4 hours, in a suitable atmosphere, such as a dual atmosphere where the anode is exposed to a gaseous component selected from the group consisting of hydrogen and nitrogen, with air flowing into the cathode side.

Subcells employed in the invention can be formed in groups that are less than an entire fuel cell stack. For example, a group of between about six and about ten subcells can be formed together by co-firing to thereby form a subassembly. Subassemblies can then be combined in series using a bonding layer. It is also to be understood that the arrangement can be reversed, whereby each subassembly can have an interconnect at an active anode of each subcell and at the end of each subassembly, and a non-functional cathode, referred to as a terminal cathode, can be placed after the interconnect at the end of each subassembly, as shown in FIG. 1D. In the embodiment shown in FIG. 1D, subassemblies are connected in series into a fuel cell stack 10 using a third bonding layer 34 between the terminal cathode 35 of one subassembly to the active cathode 16 of the second subassembly. The composition of third bonding layer 34 is preferably distinct from that of first bonding layer 31 or the cathode layer 16. For example, third bonding layer 34 can be formed of a conductive perovskite such as lanthanum strontium manganite (LSM) with a composition such as $(La_{0.9}Sr_{0.1})MnO_3$ that can sintered at temperature as low as 1000° C. Alternatively, third bonding layer 34 can be microstructurally distinct from first bonding layer 31 or cathode layer 16. For example, a conductive perovskite such as lanthanum strontium manganite (LSM) with a fine particle size that can form a bond between two subassemblies at a temperature that is in a range between about 50° C. and about 150° C. lower than the co-firing temperature used to fabricate subassemblies. Alternatively, the third bonding layer 34 can also be based on high conductivity oxides such as spinels, for example, manganese cobalt oxide or manganese iron oxide or conductive titanate pyrochlores such as $La_2Ti_2O_7$. Optional terminal cathode 35 is not an operating cathode, but can be formed of any material suitable for functioning cathodes of subcells such as lanthanum strontium manganite (LSM).

Equivalents

While this invention has been particularly shown and described with reference to exampled embodiments thereof, it will be understood by those skilled in the art that various changes in form and details may be made therein without departing from the scope of the invention encompassed by the appended claims.

What is claimed is:

1. A fuel cell assembly, comprising:
at least two subassemblies, including at least a first subassembly and a second subassembly, each subassembly including at least one subcell, wherein each subcell includes:
a first electrode,
a second electrode,
an electrolyte between the electrodes,
first and second bonding layers, wherein the first bonding layer is at the second electrode,
an interconnect layer partitioning the first and second bonding layers; and
a third bonding layer disposed between an active electrode of the first subassembly and a terminal electrode of the second subassembly, wherein the third bonding layer is microstructurally or compositionally distinct from the first and second bonding layers.

2. The fuel cell assembly of claim 1, wherein the second electrode is a cathode.

3. The fuel cell assembly of claim 2, Wherein the cathode includes at least one member selected from the group consisting of a lanthanum-manganite based material and a lanthanum-ferrite based material.

4. The fuel cell assembly of claim 3, wherein the first bonding layer at the cathode includes a component common to the cathode.

5. The fuel cell assembly of claim 4, wherein the interconnect layer includes a component common to the cathode and the bonding layer at the cathode.

6. The fuel cell assembly of claim 5, wherein the interconnect layer includes at least one member selected from the group consisting of lanthanum titanate, lanthanum chromate, strontium titanate, and lanthanum strontium titanate (LST).

7. The fuel cell assembly of claim 6, wherein the first electrode is an anode that includes nickel and at least one member containing an oxide or mixture of oxides selected from the group consisting of yttrium, strontium, and zirconium.

8. The fuel cell assembly of claim 7, wherein the anode includes a doped material including at least one member selected from the group consisting of yttria stabilized zirconia (YSZ), cerium oxide, and LST.

9. The fuel cell assembly of claim 8, wherein the anode includes YSZ having zirconia with about 15% yttria (Y2O3) by weight.

10. The fuel cell assembly of claim 7, wherein the electrolyte includes at least one member selected from the group consisting of yttria-stabilized zirconia, lanthanum strontium manganite, cerium oxide, scandia, and zirconia.

11. The fuel cell assembly of claim 4, wherein the first bonding layer includes at least one member selected from the group consisting of lanthanum strontium manganite, lanthanum cerium manganite, and lanthanum strontium nickel.

12. The fuel cell assembly of claim 11, wherein the second bonding layer includes at least one member selected from the group consisting of nickel-yttria-stabilized-zirconia, nickel lanthanum-strontium-titanate, nickel felt, and nickel mesh.

13. The fuel cell assembly of claim 12, wherein
   a) the first electrode includes nickel and at least one member containing an oxide or mixture of oxides selected from the group consisting of yttrium, strontium, and zirconium;
   b) the electrolyte includes at least one member selected from the group consisting of yttria-stabilized zirconia, lanthanum strontium manganite, cerium oxide, scandia, and zirconia;
   c) the second electrode includes at least one member selected from the group consisting of a lanthanum-manganite based material and a lanthanum-ferrite based material;
   d) the first bonding layer includes at least one member selected from the group consisting of lanthanum strontium manganite, lanthanum cerium manganite, and lanthanum strontium nickel;
   e) the interconnect layer includes at least one member selected from the group consisting of lanthanum titanate, lanthanum chromate, strontium titanate, and lanthanum strontium titanate (LST); and
   f) the second bonding layer includes at least one member selected from the group consisting of nickel-yttria-stabilized-zirconia, nickel-lanthanum-strontium-titanate, nickel felt, and nickel mesh.

14. The fuel cell assembly of claim 1, wherein the second electrode is an anode.

15. The fuel cell assembly of claim 1, wherein the active electrode is an active anode and the terminal electrode is a terminal anode.

16. The fuel cell assembly of claim 15, wherein the third bonding layer comprises NiO and yttria stabilized zirconia (YSZ).

17. The fuel cell assembly of claim 1, wherein the active electrode is an active cathode and the terminal electrode is a terminal cathode.

18. The fuel cell assembly of claim 17, wherein the third bonding layer comprises lanthanum strontium manganite (LSM).

19. The fuel cell assembly of claim 17, wherein the at least two subassemblies are bonded by co-firing with the third bonding layer at a temperature that is in a range of between 50° C. and 150° C. lower than a co-firing temperature of the at least two subassemblies.

* * * * *